Jan. 21, 1930.  N. A. KRISTMANN  1,744,643

BRAKE EQUALIZING AND OPERATING MECHANISM

Filed Dec. 1, 1926

INVENTOR.

Nicholas A. Kristmann

Patented Jan. 21, 1930

1,744,643

UNITED STATES PATENT OFFICE

NICHOLAS A. KRISTMANN, OF ATHERTON, CALIFORNIA

BRAKE EQUALIZING AND OPERATING MECHANISM

Application filed December 1, 1926. Serial No. 152,041.

My invention relates to brake equalizing and operating mechanisms wherein a plunger of substantially conical form, by means of motion in the direction of its axis transmits motion in another direction to followers, which in turn actuate the braking mechanism, the plunger being free to move transversely so as to equalize the force upon each of the several followers.

In this specification and in the annexed drawing the invention is illustrated and described in but one of the possible forms, but it is to be understood that the invention is not limited to such a form, because it may be embodied in other forms, and it is also to be understood that in and by the claims following the description, it is desired to cover the invention in whatever form it may be embodied.

Figure 1:
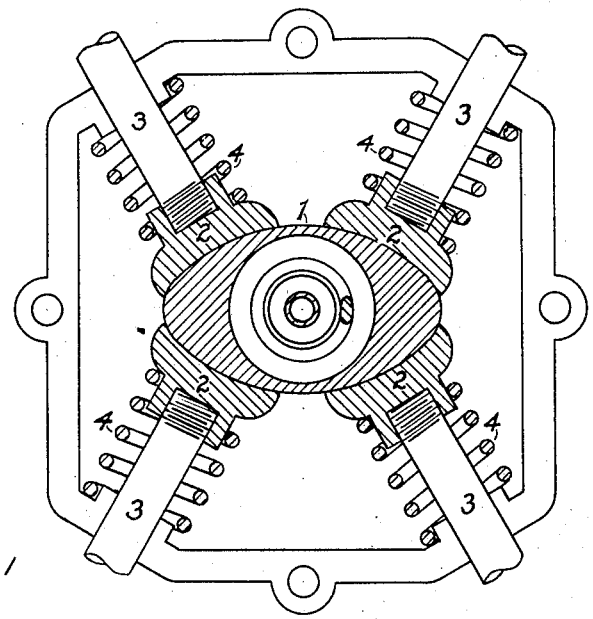
Figure 2:
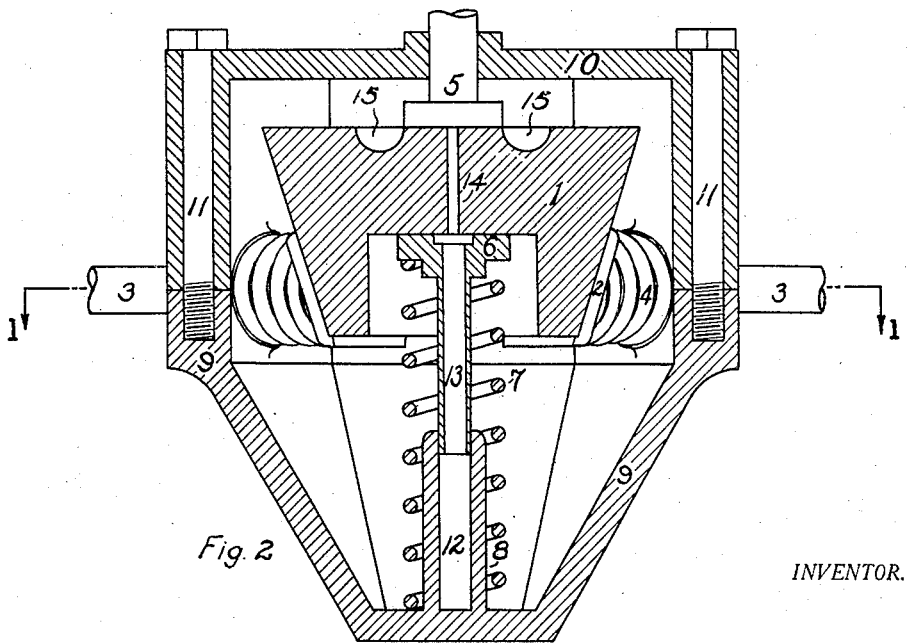

In the accompanying sheet of drawings, Figure 1 is a horizontal section through my device taken along line 1—1 of Figure 2, and Figure 2 is a central vertical section.

The plunger, 1, is of truncated conical form and of substantially elliptical section, having no fixed connection to any of the several other parts. Normally, it is held in the position shown, by the spring, 7, and its follower, 6. The braking force is applied as pressure on the member, 5. This as well as the follower, 6, has flat surfaces which allow the plunger to slide sidewise therebetween.

The followers or shoes, 2, are held against the face of the plunger, 1, by the springs, 4, and are forced outwardly when the plunger descends, due to the wedge action of the latter, and this motion is transmitted, through means not shown, to the four brakes of the system.

The plunger return spring, 7, in the drawing is represented as being held in the proper position by means of a shoulder on its follower, 6, and the well, 8, rising from the bottom of the case, 9, which houses the entire mechanism. The cover, 10, has an opening thru which operates the linkage by which the force is applied to the mechanism. The cover is held to the case, 9, by means of screws, 11.

By making the follower, 6, fit fairly tightly into the opening in the projection, 8, and providing such passageways as 13 and 14, the motion of the follower cam be made to force lubricant from the lower part of the case to the surfaces of the plunger where there is sliding motion.

In operation, when the member 5 is depressed for the purpose of setting the different brake mechanisms the wedge is forced downwardly against the opposition of the spring 7. At the same time, however, the wedge may move sidewise in a transverse plane under the influence of the different resistances offered by the different brake mechanisms, since the plunger 1 is free to slide laterally between the contacting faces of the members 5 and 6. It will thus be noted that the plunger 1 automatically assumes a position in which the pressures exercised on the various brake mechanisms are equalized so that all the brakes respond to the braking action with equal force.

It should also be noted that depressing of the plunger causes the tube 13 to descend into the well 12 and to force a lubricant stored therein through the tube between the contacting surfaces of the plunger and the member 6, and further through the perforation 14 between the contacting surfaces of the plunger 1 and the operating element 5. By this lubricating arrangement sidewise motion of the plunger 1 relative to the two actuating elements 5 and 6 is facilitated so that the plunger may the more easily respond to changes in the resistance offered by each brake element.

It should also be noted that an annular groove 15 is provided in the upper surface of the plunger 1 to allow a lubricant to accumulate therein.

I claim as my invention:—

1. In a brake equalizing and operating mechanism, a well, a tube telescoped therein and a wedge element resting on the tube with freedom of sliding motion, and allowing a lubricant to be forced from the well through the tube and between the contacting faces of the tube and the wedge element.

2. In a brake equalizing and operating mechanism, a well, a tube telescoped therein, a wedge element resting on the tube with freedom of lateral sliding motion, and an operating member bearing on the wedge element, the wedge element being perforated so as to allow a lubricant to be forced from the well through the tube and wedge element to the bearing surfaces between the wedge and the operating element.

3. In a device of the character described, a wedge element having flat top and bottom surfaces and means engaging the latter for imparting endwise motion to the wedge element, the said means contacting the surfaces over a wide area so as to allow the wedge element to move freely in a transverse plane when moving endwise.

4. In a device of the character described, a wedge element having flat top and bottom surfaces and means engaging the latter for imparting endwise motion to the wedge element, the said means contacting the surfaces over a wide area so as to allow the wedge element to move freely in a transverse plane when moving endwise, and means affected by endwise motion of the wedge element for forcing a lubricant between the contacting faces.

5. A brake equalizing device for a vehicle, having a plurality of independent brakes, of an actuating member for each brake, a wedge-shaped member contacting with all of said actuating members, said wedge-shaped member having freedom of sidewise motion, and a slight rotative motion, and means for imparting endwise motion to said member.

6. In a brake equalizing device, a casing for holding a lubricant, a wedge-shaped member slidable vertically within said casing, brake actuating members projecting from said casing, and contacting with said wedge, means for urging said brake actuating members against said wedge, and means for imparting endwise motion to said wedge for actuating said brake members.

7. In a brake equalizing device, a casing for holding a lubricant, a wedge-shaped member slidable vertically within said casing, brake actuating members projecting from said casing, and contacting with said wedge, means for urging said brake actuating members against said wedge, and means for imparting endwise motion to said wedge for actuating said brake members, said wedge having freedom of endwise motion with respect to said actuating means, and a slight rotative motion to automatically compensate it with respect to said brake actuating members.

8. A brake equalizing device for a vehicle comprising a plurality of brake actuating members, a wedge-shaped member contacting with all of said actuating members, said wedge-shaped member having a slight rotative motion about its longitudinal axis and means for imparting endwise motion to said member for operating said brake members.

NICHOLAS A. KRISTMANN.